H. H. HORNSBY.
MEANS FOR TREATING PLANTS.
APPLICATION FILED APR. 2, 1915.
1,331,261.
Patented Feb. 17, 1920.
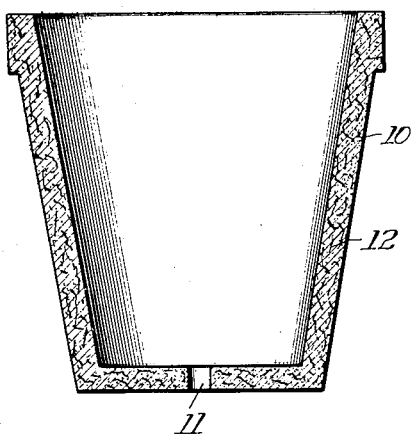
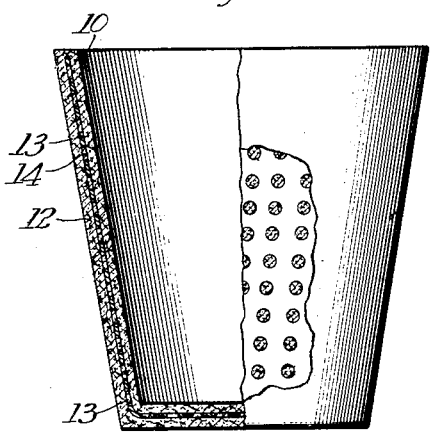
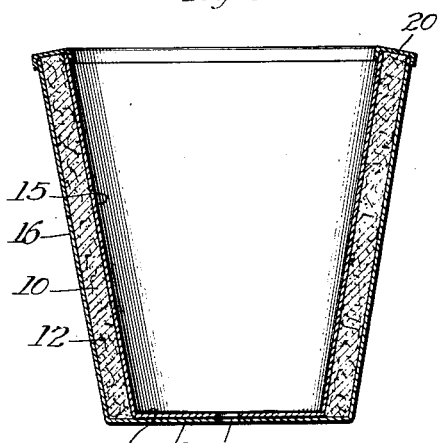
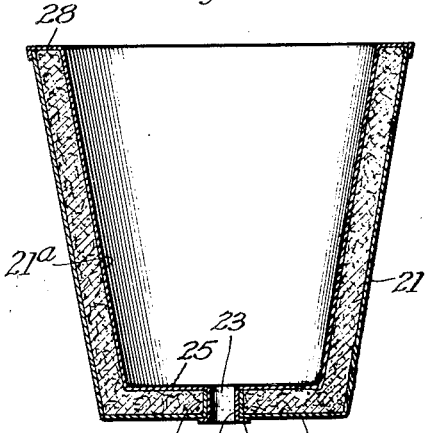
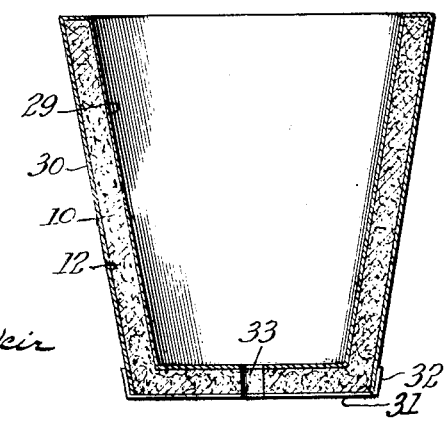
Witnesses:
Robert H. Weir
Inventor
Harry H. Hornsby
By Jones, Addington,
Ames & Seibold, Attys.

UNITED STATES PATENT OFFICE.

HARRY H. HORNSBY, OF CHICAGO, ILLINOIS.

MEANS FOR TREATING PLANTS.

1,331,261.

Specification of Letters Patent. Patented Feb. 17, 1920.

Application filed April 2, 1915. Serial No. 18,658.

*To all whom it may concern:*

Be it known that I, HARRY H. HORNSBY, a citizen of the United States, residing at Chicago, in the county of Cook and State of Illinois, have invented new and useful Improvements in Means for Treating Plants, of which the following is a full, clear, concise, and exact description, reference being had to the accompanying drawing, forming a part of this specification.

My invention relates to a means for treating plants, flowers and the like.

It is the usual custom among plant growers to plant the seed or bulb, or to place the young plant in an ordinary flower pot, the early growth being carried on in frame beds, greenhouses and the like. When it becomes advisable to transfer the young plant to outdoor beds, window boxes or its other more or less permanent location the plant is removed from the small pot and placed in the earth. It is also customary to plant the seeds or bulbs in frames and to later transplant in frames and still later into pots or directly into the earth. One objection to this procedure is that oftentimes in the transplanting or transferring of the plant the small tender roots and plant are injured resulting in the death of the plant or retardation of its growth and making it susceptible to bacteria injury. Another objection is that when the planting or transplanting takes place suitable fertilizer or plant food will oftentimes not be supplied either through ignorance, negligence or indifference.

It is one of the objects of my invention to provide a means for treating plants by virtue of which plants may be transferred to their more or less permanent location without entailing the injurious removal of the transplanting process mentioned and by which the plants will be given, both before and after transfer, proper fertilizer or food.

It is a further object of my invention to provide a plant receptacle in which the seed, bulb or plant may be given its initial growth, which may be set in the ground or soil with the plant thus avoiding the removal of the plant in transplanting, and which will furnish the plant both before and after transfer with proper food.

In the propagation of young plants it has been found that certain soils, containing injurious bacteria, retard their growth. Through the use of soils which are sterile of such bacteria the plants thrive within these food enriched receptacles which, also, for a time offer obstruction to the ingress of certain forms of bacteria.

Further objects of my invention are to provide such a receptacle that may have, as one of its constituent parts, a suitable amount of the particular food required for a particular plant, to provide a receptacle of the sort described such that will decompose or disintegrate at a time which may be predetermined with sufficient accuracy; and to provide such a receptacle that is economical to manufacture.

Additional objects and advantages of my invention will be apparent from the following description taken in connection with the appended claims.

I have described in the following specification and illustrated in the accompanying drawings plant receptacles by means of which plants may be treated as described above, it being understood that changes may be made in the form, construction and arrangement of the parts without departing from the spirit of the invention or exceeding the scope of the appended claims, the forms of the invention herein disclosed being merely preferred embodiments thereof.

In the drawings—

Figure 1 is a vertical cross sectional view of a plant receptacle constructed in accordance with my invention;

Fig. 2 is a similar view of a modified form of the same; and

Figs. 3–5 are similar views of further modifications of the receptacle.

In the use of my invention I give the young plant its initial growth, from seed, slip, bulb or the like in a receptacle having among its constituent parts fertilizer, form-retaining and other elements. This initial growth ordinarily takes place in green houses, frames and the like in the manner customary in plant growing. When the desired time comes for transplanting to the ground or other more or less permanent beds, instead of removing the plant from the receptacle, as has been the common practice heretofore, I transfer it in its receptacle, plant and pot being set into the soil together, undisturbed. The receptacle is of a nature to break down after a suitable time by decomposition or disintegration or both, under the influence of moisture, chemical action, plant growth, and the like, thus permitting the further growth of the plant without hindrance. The time of this breaking down may be predetermined with accuracy sufficient to enable a suitable receptacle to be chosen for a particular plant or use. It will be clear that as the receptacle breaks down the plant roots will be surrounded by food to stimulate their growth. In addition, this food is supplied from the first even before the receptacle breaks down. Due to the action of moisture and other causes salts are formed on the pot walls which are in proper form to enable the roots to derive nourishment therefrom, and this food is absorbed by the roots from the pot walls. And the character of the food may be varied to suit a particular species of plants, such food or foods as are helpful being included and foods that would be harmful for the species of plant in question being excluded.

In addition to aiding the plant growth by supplying food the receptacle may include elements to cause supplemental stimulation. It has been demonstrated by experiments that electrical effects stimulate plant growth. The mass from which the pot is formed, therefore, may have mixed therein some such elements as ground carbon and metallic zinc or lead. There will be present in the mass certain salts, such as chlorids. When the pot is subjected to moisture a chemical reaction will be set up between the carbon and zinc or lead, through the action of salts, causing electro-chemical effects which further stimulate the plant growth.

As a protecting feature, the receptacle may have as one of its constituent parts, an agent such as nicotin, arsenates, and the like, capable of destroying injurious parasites.

Referring now to the drawings, 10 represents a receptacle of the form of the ordinary flower pot of commerce, of a size to hold young plants, though it will be apparent that the invention contemplates pots of practically any size or shape. This pot is formed from a mass containing natural animal or artificial chemical fertilizer or both, and strengthening and binding elements. As natural animal fertilizers and most of the artificial chemical fertilizers are alone non-plastic for this purpose; and as, even if these could be formed into shape, they would be friable and would crumble upon drying, to obtain the necessary cohesion and plasticity I add to the fertilizer, in suitable proportion, a binder which gives the pot its cohesive strength. This binder may be of various materials, as for example, plaster of Paris, coal tar pitch, dextrin, sodium sulfate, pitch compound, or other materials of binding qualities and of a character to be non-injurious to plant life and to allow molding.

When pots are manufactured on a large commercial scale drying in the forms may not be practical. Consequently the pots, in addition to the necessary ultimate cohesive qualities, should preferably have a cohesive consistency that will permit of their removal from the forms before drying. The addition of sufficient binder of this sort just described in the undried state to obtain this end is too costly and would render molding difficult. So I add a bond to the mass to make it coherent enough and plastic enough to be molded readily and removed before drying. The requisite plasticity and consistency may be provided by the addition, for example, of plastic clay in suitable proportion. This is the least expensive form of bond and is thoroughly efficient. In addition to the points mentioned the use of plastic clay has the further advantage that it serves as a vehicle for salts, such as potassium sulfate, potassium chlorid, kainit, saltpeter and ammonium sulfate, and retards their too rapid dissolution. Because of this prevention of too rapid dissolution of certain salts by the clay, the formation of objectionable molds, which are found in mixtures of natural animal fertilizers and soil alone, is prevented. Plastic clay is inactive against fertilizers, increase in proportion of clay used is harmless, and so this material is the best medium for changing the percentage of the fertilizer, the purpose of which is hereinafter set forth. With the use of certain fertilizers and binders the receptacle would be too homogeneous in character to permit disintegration within the proper time. Plastic clay further provides to the mass a certain degree of granulation thus making it possible for the disintegrating forces to suitably operate.

The materials used are crushed or ground, preferably small enough to pass #18 mesh or smaller. They are thoroughly and intimately mixed before the binding agent is added, to present a uniform mass. The binding agent is then mixed in, and lastly water, in suitable amounts is added, and the mass is thoroughly mixed until the proper plastic consistency is obtained. At the time of mixing the batch, the electro-chemical and parasite-destroying agents mentioned are added if such are to be used. If desired, lamp black or carbon may be added also at this time to give the receptacle a dark color, so that it will absorb heat.

The pots may be formed by molding, or the potter's wheel or machinery based thereon may be used, but I prefer to manufacture by means of a die press operated either by hand or power. In any case the operation is so well known that it is needless to describe it here.

The pots are removed in the undried state, as before mentioned, and are allowed to dry and harden in a manner depending upon the materials used. When coal tar pitch, corin (which is a by-product of the sugar-manufacturing industry) and pitch compounds are used as strengthening binders the formed pots are baked at 150–200° cent. If the strengthening element is, for example, cement, plaster of Paris, dextrin or sodium silicate, the pots are air dried for from two to four days according to size. It must be noted that the fertilizer should not be affected by the binder in its hardening process so if the strengthening binder is of the first class mentioned, a fertilizer should be chosen which can be subjected to a baking process. Certain fertilizers cannot be baked without injury, as for example, manure, ammonia salts, mineral or chemical with crystal water escaping at or below 200° cent. So for batches which are to be baked I utilize as fertilizer some such form as limestone, phosphate rock, saltpeter, kainit, potassium chlorid, potassium sulfate and the like.

Receptacles so formed are sufficiently non-fragile and non-friable for ordinary uses. That is to say they may be handled, packed, shipped and the like in the manner of the ordinary flower pot of commerce. Furthermore they have strength enough to retain their form for a time when in active use under growing conditions, the length of this time varying as hereinafter appears.

It will be apparent that, as some plants develop more quickly or grow more rapidly than others, and for other reasons, it is desirable that pots for certain plants and under certain circumstances should break down more rapidly than for other plants and under other circumstances. It has been stated that the time of breaking down could be predetermined. This is done by varying the relative proportion of the fertilizer and binder. With a relatively small amount of fertilizer and large amount of binder the breaking down will not take place as rapidly as when less binder and more fertilizer is used.

For example, considering the following formulæ, a pot made from a batch mixed in accordance with formula C will take considerably longer to break down than one made in accordance with formula B. Although under ordinary circumstances rapid breaking down is to be avoided, it may at times be desirable to have the pot disintegrate or decompose sooner than is ordinarily the case. Thus the breaking down of a receptacle made in accordance with formula A will be relatively rapid compared with the other examples given. So by proper variation of the relative percentages a wide range of resisting quality is obtained.

The formulæ referred to are:

|  | A. | B. | C. |
|---|---|---|---|
| Sheep manure | 30% | 26% | 22% |
| Plastic clay | 50% | 50% | 50% |
| Plaster of Paris | 20% | 24% | 28% |

Add 48% water.

As shown in Fig. 1, the pot may be made, and preferably is made, with a small opening 11 in the bottom for water drainage. If desired the walls may be reinforced by hair or fibrous material 12 which may be placed up and down around and around or criss-cross. And a filler or surfacer for prolonging the life of the pot may be applied if desired.

Fig. 2 illustrates a plant receptacle formed of materials as the above, the mass being molded or compressed onto a form 13 of paper or other suitable material of the approximate shape of the receptacle. This paper shell is not harmful to plants and is of a nature to aid, directly or indirectly, the plant growth, in adding humus to the soil. It is rigid and non-fragile enough to serve its purpose as a receiving form and it is of a character to decompose or disintegrate in course of time so that it will break down with the rest of the pot. The form member 13 is preferably provided with a plurality of perforations 14 to facilitate continuity of the fertilizing elements.

My invention embraces also the use of plant receptacles which will break down and which contain plant food and other agents of a nature such that these elements are held in the form of the pot, not by an inherent binding agency, but by an envelop or container such as shown in Figs. 3–5. Fig. 3 illustrates a container preferably of paper. An inner cup 15 fits within an outer cup 16 so that the side walls are spaced apart about the distance of the thickness of an ordinary flower pot. At their lower edges the side walls are bent inwardly to form a bottom for the pot, the bottom 17 of the inner cup resting on the bottom 18 of the outer cup and secured thereto by a drop of glue, crimping, a suitable mechanical fastener or the like. A small opening 19 is formed in the bottom for water drainage.

Fertilizers and chemicals of a sort to meet particular needs are ground or pulverized and mixed to a suitable consistency and the envelop or double walled receptacle is filled with the mass. The upper edges of the cups are sealed by a cap 20 which has downturned flanges fitting inside and outside the receptacle and which may be glued or otherwise secured in place.

The paper cup may have various other forms, as for example, those shown in Figs.

4 and 5. Referring to Fig. 4, an outer cup shaped member 21 has a bottom 22 which is provided with an opening 23 about which there is an upturned flange or lip 24. An inner cup member spaced from the outer shell as before has a bottom 25 with an opening corresponding to opening 23 and about this opening is a down-turned flange 26 corresponding to flange 24, and an outwardly extending lip 27. It will be seen that the flange and lip of the inner shell fit over the flange and bottom edge of the outer shell and the parts may be glued, crimped or otherwise secured in place. When the wall space has been filled with suitable plant food, injurious parasite-destroying, electro-chemical and other agents, if desired, a flap 28 on the inner shell may be folded across the opening, down over the outer shell and crimped, glued or otherwise fastened.

In Fig. 5 a blank is formed into an inner cup-like shell 29 having the usual side walls and bottom, and, at the top edge it is turned outwardly and then downwardly approximately parallel with the inner shell to form an outer shell 30. This latter extends somewhat below the bottom of the inner shell. The receptacle is filled and the bottom is sealed with a cap 31 having a flange 32 by which it may be crimped, glued or otherwise secured to the outer shell 30. An opening 33 for water drainage may be provided if desired.

As in the case of the forms above described, in using these latter forms the plant is given its initial and early growth in the receptacle which is later set in the soil without removing the plant. Under the influence of moisture and plant growth the receptacle breaks down in suitable time thus leaving the plant roots free to grow and surrounded by proper food. This food is also supplied before the pot breaks down as the moist paper walls take up certain salts from the inclosed chemicals which are absorbed by the roots.

The time of breaking down of the pot is predetermined by various means, such as the choice of the kind of paper used and the use of protective surfaces applied to the paper, the more compact the character of the paper the longer time it will take before breaking down occurs.

One of the fundamental advantages attained by my invention is, as before stated, that plants may be given their initial and early growth in receptacles which may be set in the ground with the plant thus avoiding the dangers and objections of transplanting in the usual manner as heretofore known. Another advantage is that the plant is given proper food for its particular needs and may be surrounded by injurious parasite-destroying agents. And a still further and greater advantage is the combination of these features. The benefits of my invention may perhaps best be shown by an illustration of the advantages attained. For example, the case of a small plant grower is taken. At present he grows his plants from seed, bulb or the like, in small pots or frames until such time as they may be transferred to the soil outdoors or elsewhere. He then removes the plant and its surrounding earth from the pot and thereby ordinarily injures the roots and creates a condition making the plant susceptible to bacterial injury or retards its growth as already mentioned. The plant is set in the soil usually with some sort of fertilizer which is perhaps quite unsuited to the need of the particular plant. Oftentimes he will use the same fertilizer for his whole garden. Agricultural experts in government departments and elsewhere are continually proclaiming the need of better and more scientific fertilization. They have proved, and are proving by experiments and trials what foods are necessary for the best possible growth of particular plants. But the average small grower and others ordinarily do not have this information or neglect to use it. By means of my invention it will be possible for them to order receptacles for so many plants of this kind, so many of that, and the pots furnished him will be manufactured to meet the particular needs of the plant in question. That is they will contain the proper food and food values for the particular plant and will be designed to break down at a suitable time in view of the particular conditions of growth.

In addition to the advantages mentioned, another feature of value connected with the use of these receptacles is that the fertilizer or plant food furnished by the broken-down pot will each year be plowed into the ground.

It is to be understood that the use of my invention just described is but an example, as a great variety of uses and benefits will become apparent to one conversant with the art. It is also to be understood that the particular fertilizers, binders and other materials specified are not mentioned by way of limitation, but as examples, as there are various others equally available which are within the spirit of the invention and the scope of the appended claims.

Having thus described my invention what I claim as new and desire to secure by Letters Patent is:—

1. A receptacle for plants comprising a mixture of fertilizer, a material which sets and hardens in drying and a material which is plastic for holding the pot in shape until it is dry.

2. A receptacle for plants comprising a mixture of plaster Paris, clay and fertilizer.

3. A receptacle for plants comprising particles mixed into the material forming the walls of the receptacle which co-act with each other to generate electricity.

4. A receptacle for plants comprising a mass containing fertilizer shaped to form a receptacle, and a shell of material readily disintegrable when placed in the soil embedded in said mass.

5. A receptacle for plants comprising a mass containing fertilizer shaped to form a receptacle, and a shell of material readily disintegrable when placed in the soil, embedded in said mass, said shell having a plurality of perforations through which said mass extends.

In witness whereof I have hereunto subscribed my name.

HARRY H. HORNSBY.